INVENTOR.
Arthur B. Chapman

INVENTOR.
Arthur B. Chapman

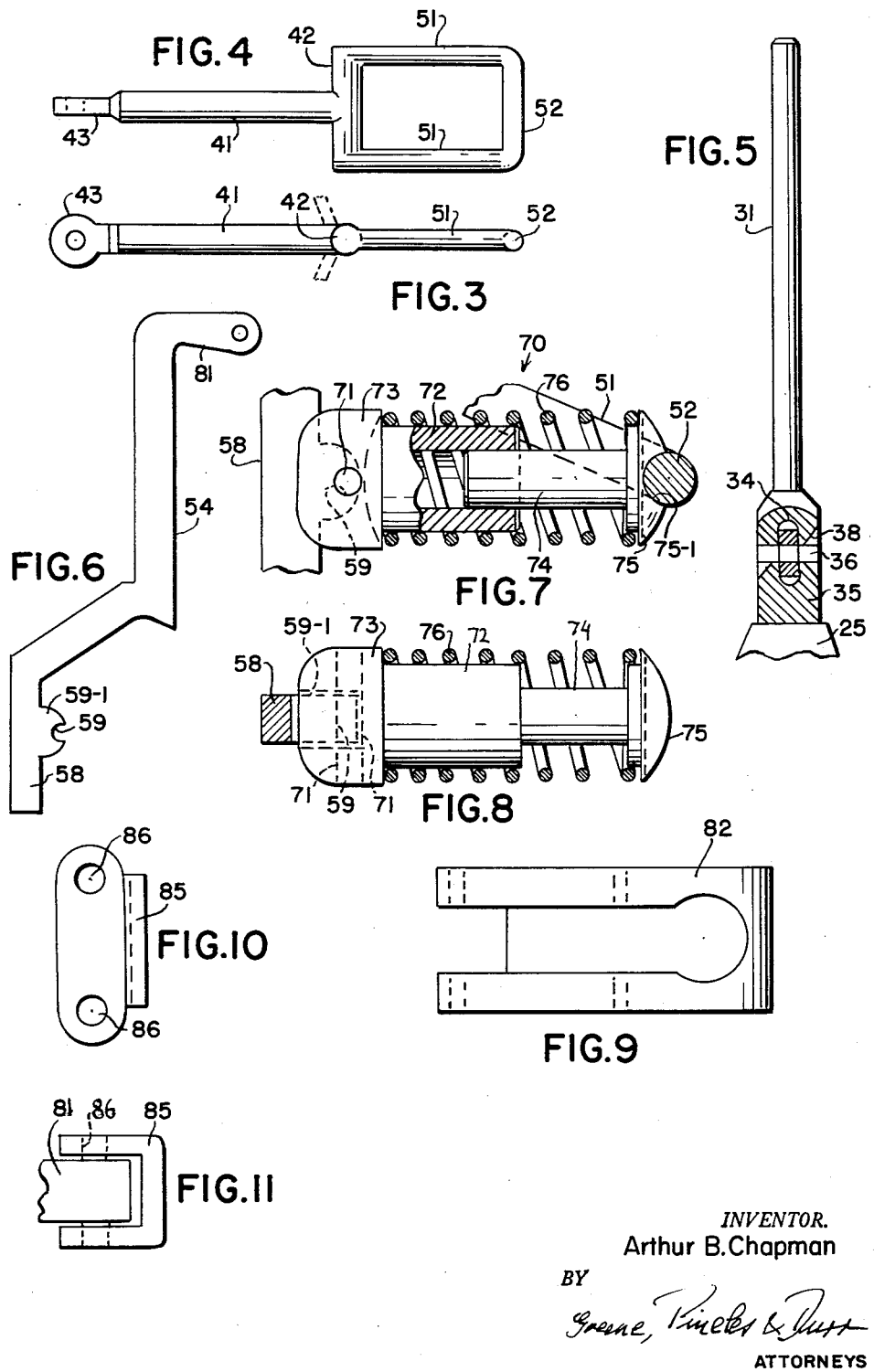

United States Patent Office 2,987,224
Patented June 6, 1961

2,987,224
MEASURING DISPENSER DEVICES FOR DISCRETE, SOLID PARTICLE SUBSTANCES
Arthur B. Chapman, 1530 S. Ocean Blvd.,
Pompano Beach, Fla.
Filed Sept. 16, 1960, Ser. No. 56,464
17 Claims. (Cl. 222—365)

This invention relates to measuring dispenser devices for dispensing a measured volume of flowable, discrete, solid particle substances from a storing container. The present invention was evolved in overcoming difficulties encountered in dispensing measured volumes of instant coffee powder particles under humid climate conditions. Even when lifting a measured volume of instant coffee powder with a smooth stainless steel spoon from a coffee jar or container, instant coffee particles will adhere to the surface of the spoon because the moisture absorbed by the highly hygroscopic coffee powder, causes the powder particles to stick even to smooth surfaces with which they come into contact. As a result, difficulties have been encountered in devising a measuring dispensing device which will operate without trouble for a long period of time in dispensing coffee powder and like hygroscopic, flowable particle-substances from a container, and which will prevent escape, evaporation or loss of flavor, aroma and essences of the powder contents, and also prevent entry or access of moisture or water vapor to the container holding such hygroscopic powder substances.

Among the objects of the invention is a measuring dispensing device for dispensing instant-coffee powder and like hygroscopic powder substances that will overcome the foregoing difficulties and safeguard for prolonged periods of time, the flavor, aroma and essences of the to-be dispensed particle-substances while stored within the container. In accordance with the invention, a dispensing casing device attachable with an air or gas-tight seal to an opening of a container holding stored, flowable, hygroscopic particle-substances or powder that is to be dispensed, is provided with an ejector structure having an inward closure surface held in sealing engagement with an outwardly-facing closure surface along the discharge opening of the dispenser casing, the ejector structure being movable from its inward closure position to an outward ejector position with an impact-like, abrupt dispensing motion in which an interceptor surface thereof ejects a measured volume of the powder content of the container through the discharge opening of the dispenser casing, which is opened for only a short instant. Such abrupt dispenser-motion of the ejector structure effects not only impact-like ejection of a measured volume of the powder content from the interior casing space, but also subjects the overlying powder body held in the dispensing casing and the container to an impact action which causes the interior casing space from which a powder volume was ejected, to be instantaneously refilled with the powder volume that is to be ejected in the next dispensing action, without requiring shaking of the casing and container.

In accordance with the invention, such dispensing device has chargeable spring means carried by the dispensing casing and connected to the ejector structure for imparting thereto an abrupt, impact-like motion when actuating the ejector structure, both in its dispensing motion from the normal inward closed position to its outward ejector position, and in its return motion from its ejector position to its inward, normal closure position. Each of these abrupt motions imparts to the enclosed powder body, agitation impulses which assure that the casing interior underlying the powder ejector surfaces of the ejector structure is rapidly refilled with powder from the enclosed overlying powder body. This arrangement makes possible a rapid succession of dispensing operations in which a desired large multiple of measured powder volume is discharged, for instance into a vessel in which instant coffee is used to prepare a large volume of drinking-coffee.

Although the present invention was evolved in connection with the dispensing of powdered instant coffee, the features of the invention are not limited thereto, and are of value in dispensing other flowable particle-substances consisting of discrete, solid particles, or, in general, a solid powder-particle substance.

The foregoing and other objects and features of the invention will be best understood from the following description of an exemplification thereof, reference being had to the accompanying drawings, wherein:

FIG. 3 is an elevational view of the operating lever of the dispensing device as seen in FIG. 2;

FIG. 4 is an elevational view of the operating lever of FIG. 3, as seen from the top thereof;

FIG. 5 is an elevational view of the elongated guide rod of the ejector structure, as seen in FIG. 2;

FIG. 6 is an elevational view of the actuating slider as seen in FIG. 2;

FIG. 7 is an elevational view with parts in cross-section, of the compression-spring link, as seen in FIG. 2;

FIG. 8 is an elevational view of the compression-spring link as seen from the top of FIG. 7;

FIG. 9 is an elevational view of the actuating lever of the device, as seen from the bottom side thereof, in FIG. 2;

FIG. 10 is an elevational view of the link connection between the actuating lever and the actuating slider of the device, as seen in FIG. 2; and FIG. 11 is a top view of the link, as seen in FIG. 10.

Figure 1:
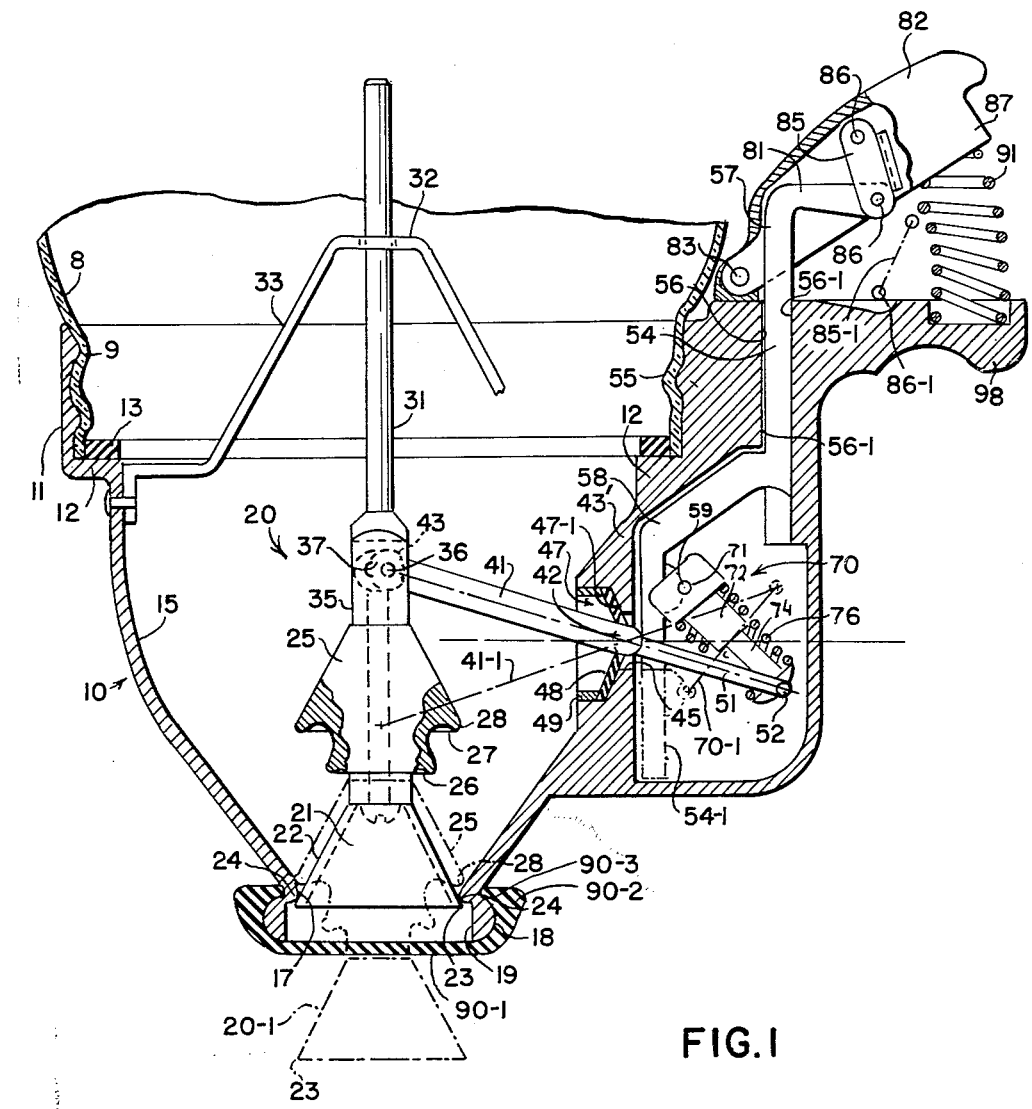
FIG. 1 is a cross-sectional view of an end portion of a conventional jar of the type used in storing powdered coffee, having attached thereto one form of dispenser device of the invention, with the jar held in inverted position ready for dispensing a measured volume of instant-coffee powder contents thereof.
Figure 2:
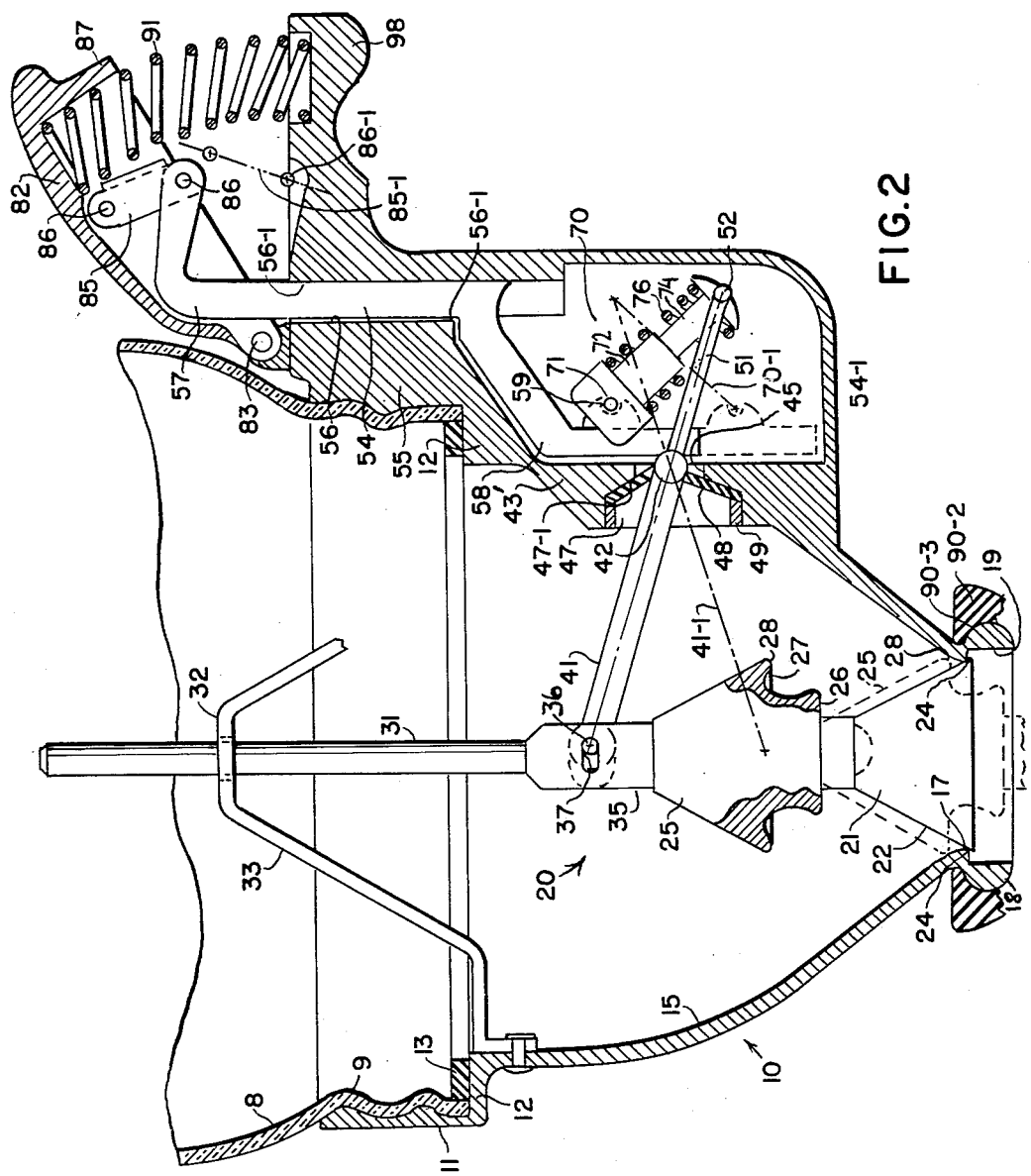
FIG. 2 is an enlarged view of the structures of FIG. 1.

FIGS. 1 and 2 show a conventional coffee jar or container 8 held in inverted position for dispensing instant-coffee powder from the interior thereof through a dispensing device of the invention generally designated 10–1, having a dispenser casing 10 held detachably joined with an air or gas-tight seal to an opening of the container. To the neck 9 of the container, surrounding its relatively large, conventional outlet opening, is detachably secured, as by conventional threaded engagement, the surrounding junction wall portion 11 of dispensing casing 10. The casing junction wall portion 11 has at its downward end, as seen in Figs. 1 and 2, a wall portion 12 overlying the edge of the jar neck 9 and holding sealingly compressed against it, a packing washer 13 of elastically compressible material of suitable synthetic resin, such as polypropylene, polyethylene or neoprene. The dispensing casing 10 encloses an interior casing space 15 into which the to-be-dispensed powder substance of the jar 8 will drop by gravity when the jar 8 is held in inverted position, as seen in FIGS. 1 and 2. The axial end of casing 10 opposite to the end joined to the jar neck 9, has a narrower discharge neck with a discharge opening 17 through which dispensed powder is discharged from the casing interior 15 in the inverted casing position of FIGS. 1 and 2. The casing discharge opening 17 is adjoined by outwardly-projecting neck flange 18 surrounding a slightly wider flange opening 19, all coaxially aligned along the vertical axis of dispensing casing 10, as seen in FIGS. 1 and 2. The interior surface of casing 10 adjoining the casing opening 17 has an outwardly narrower, funnel shape, for causing powder particles from the interior of the container jar 8 dropping into the casing space 15, to flow toward the downward narrower discharge opening 17 thereof.

In the interior casing space 15 is held an ejector structure 20 for reciprocal movement generally along a vertically coaxial ejector path thereof between the full-line inward closure position of FIGS. 1 and 2, and the opposite outward ejector positions shown by dash-dot lines 20–1 of FIGS. 1 and 2. In the form shown, the ejector structure 20 has an outward closure section 21 with an inwardly-facing closure surface 22 tapering from the wider, outward, end-region 23 to a narrower inward region thereof. In the full-line closed position of FIGS. 1 and 2, the outward end-region 23 of the tapering closure surface 22 is held in closure engagement against the outwardly-facing casing neck-edge surface 24 of casing discharge opening 17, for preventing dropping-out of powder from the funnel-shaped casing interior 15 through casing neck opening 17.

In accordance with a phase of the invention, the casing neck-edge surface 24 of the outward casing neck portion is relatively sharp, to prevent accumulation or adherence thereto of moisture-holding powder particles, and thereby preventing establishment of good closure engagement between the casing neck-edge surface 24 and the overlying inwardly-facing closure surface of the wide end portion 23 of the ejector closure section 21. The reciprocating ejector structure 20 has coaxially aligned therewith a more inward ejector section 25 adjoining the narrow inward end of the inwardly-tapering closure section 21. In the region adjoining the inward, narrow end of the outwardly-tapering closure section 21, the ejector section 25 has relatively extended interceptor surface portions 26, 27 extending transversely to the direction of its ejector motion or path, for scooping up with the interceptor surfaces 26, 27, powder particles filling the underlying space, and for imparting an abrupt ejection motion and ejecting the so scooped-up powder body through the casing discharge opening 17 when the ejector structure 20 is abruptly moved from the shown full-line closure position to the dash-dot-line discharge position 20–1 of FIGS. 1 and 2.

In the form shown, the ejector section 25 has an inwardly-facing surface which, like the similar surface of the adjoining closure section 21, tapers inwardly from the wider outward border edge 28 of the interceptor surface 27 to the more narrow inward end thereof. These inwardly-tapering, outer surfaces of the closure section 21 and ejector section 25 of ejector structure 20 have a shape which causes powder particles overlying them in their inverted position shown in FIGS. 1 and 2, to flow in downwardly outward direction towards the discharge opening 17 and fill the space between the ejector interceptor surfaces 26, 27 and the underlying, outwardly tapering surface of closure section 21. For guiding the ejector structure 20 in its reciprocating motion generally along its coaxial ejector path, it has—in the form shown—an inwardly-extending guide rod 31 held and guided in a guide seat or opening of a guide collar 32 suitably supported, as by a plurality of spokes 33, on casing-wall portions of dispenser casing 10. The collar spokes 33 are suitably secured to the casing walls of dispensing casing 10 by joints such as rivets, solder, or yieldable elastic snap-action joints, where one of the joined parts is elastically embraced and retained by the complementary part, in a manner analogous to the bottle cap joint of U.S. Patents 2,716,147 and 2,789,717 and the references cited therein, with or without self-curing cement at the joined surfaces. Alternatively, such joints may be formed by cement, or by heat-sealing, if the spokes and casing are made of heat-sealable synthetic resin compositions, such as polyacetal ("Delrin"), polypropylene, polyethylene. Additional motion guidance of ejector structure 20 along its coaxial ejector path is provided by its pivotal connection to an operating lever 41 pivotally supported by its transversely extending lever pivot 42 adjacent a wall portion 43 of dispenser casing 10 and serving to impart to the ejector struucture, the reciprocating coaxial motion between its full-line closed position shown, and the dash-dot-line ejector position 20–1 (FIGS. 1, 2). The height of the ejector section 25 of the ejector structure 20 is so designed in relation to the length of its reciprocating motion between opposite closure and ejector positions, as to cause the outward border edge 28 of its interceptor surface region 27 to serve as a closure surface which establishes closure engagement with the inwardly-facing, funnel-shaped casing surface adjoining casing discharge opening 17, and thereby seal off the interior space of dispenser casing 10 and container jar 8 from the outside water-vapor-containing atmosphere.

Referring in detail to FIGS. 3 and 4 of the operating lever 41, its inward end 43 has the shape of a flat pivot collar, shaped to fit within a slot opening 34 of the wider inward end section 35 of ejector guide rod 31 to which it is joined by a pivot connection 36 (such as shown in the detail view of FIG. 5). The pivot connection 36 engages a transversely-extending guide slot 37 of ejector guide-rod section 35 (FIG. 2) to provide for a lost motion of their conventional pivot connection 36, as the operating lever 41 is tilted from the full-line closure position 41 to the dash-dot-line ejector position 41–1 (FIG. 2), wherein the closure border edge 28 of the ejector section 25 establishes closure engagement with the inwardly-facing, funnel-shaped wall surface of dispenser casing 10.

The transverse lever pivot rod 42 of operating lever 41 is retained within a transverse slot recess 45 formed in the outward casing wall face of dispenser casing section 43' along which lever pivot 42 is pivotally supported. The casing wall section 43' has in the region of its outer wall recess 45, a central, small opening dimensioned to permit passage therethrough of the inward lever arm of operating lever 41 and its pivot end portion 43 which is pivotally connected to ejector structure 20. It is essential to assure a vapor-proof seal between the operating lever 41 and the opening in casing wall section 43' through which operating lever 41 passes to the exterior of casing 10. In the form shown, the casing wall section 43' is provided on its interior wall surface with a countersunk, cylindrical sealing compartment 47 having an outwardly-tapering bottom surface along which is retained a flexible, conically-shaped sealing washer 48 of suitable elastically stretchable material such as neoprene or other rubber-like material. Conical sealing washer 48 has a small opening at its central vertex, which is seated with an elastically-stretched, tight sealing fit around the cylindrical surface of the portion of operating lever 41 passing therethrough. The stretched central opening in elastic sealing washer 48 will yield elastically to permit passage therethrough of the inward pivot end portion 43 of operating lever 41 as it is assembled before the sealing washer 48 is placed in its assembled position shown in FIGS. 1 and 2.

By giving the elastically stretchable sealing washer 48 a conical shape with a sealing opening at its vertex, it is possible to position the central vertex opening of sealing washer 48 in immediate proximity with the central pivot axis of transverse lever livot pin 42, thereby reducing to a minimum the amplitudes of stretching motion that are applied to the opening region of sealing washer 48 when operating lever 41 is tilted between its full-time closure position and its dash-dot-line ejector position 41–1 around its lever pivot pin 42.

After assembly in the operating position, the periphery of elastic sealing washer 48 (of operating lever 41) is affixed in the operative position shown in FIGS. 1 and 2, by a clamping collar 49, of metal or plastic material for instance, having a tight clamping force-fit within the surrounding cylindrical surface of seal compartment 47, so as to be retained fixed therein and hold clamped with an inner circular edge surface thereof, the underlying periphery of elastic sealing washer 48 against the underlying tapered bottom wall portion of sealing compartment 47 within casing section 43'. To provide fixed clamping engagement between clamping ring 49 and the surrounding cylindrical wall surface of sealing compartment 47, the cylindrical outer surface of clamping collar 49 may have a cylindrical array of conventional, longitudinal clamping ridges. The operating lever 41 has an outer, operating lever-arm section 51 projecting outwardly from its transverses pivot rod 42. The outer lever arm section 51 has the shape of a generally rectangular frame with a transverse outer lever end portion 52 joined by two arm portions to the opposite transverse ends of the transverse pivot rod 42 of operating lever 41 (FIGS. 1–4).

In accordance with the invention, the ejector structure 20 of the dispenser device is combined with movable ejecting means including chargeable spring means connected to the operating lever and arranged so that initial movement imparted to the ejecting means from the released closure position toward the operated ejector position thereof, first charges the spring means with additional stored energy without imparting any motion to the ejector structure 20, and that further actuating motion imparrted to the ejecting means beyond a neutral position suddenly releases the charged energy of the spring means for imparting to the ejector structure an abrupt movement from its closure to its ejector position and for abruptly ejecting a predetermined amount of stored powder through the discharge opening 17 of the dispensing casing. In the form shown, the ejecting means includes an actuating slider 54 slidably mounted on a portion of casing structure 10 for reciprococal sliding motion along an actuating path between a released closure position and an operative ejector position, and a charged toggle spring link 70 including chargeable spring means 76 having at its opposite ends, pivotal connections to a portion of the outer operating lever section 51 and to a portion of the actuating slider 54, respectively.

Although it may be arranged in other ways, in the form shown, the casing wall section 43' through which the operating lever 41 passes, is provided with a guidewall section 55 having formed therein an elongated guide channel 56 within which a substantial length of actuating slider 54 is longitudinally guided along a predetermined actuating slider path thereof. The actuating slider 54 also has an inward slider arm 58 through which the actuating motion of the slider 54 is transmitted to the outer, operating arm-portion 52 of operating lever 41. The guide channel 56 of casing section 55 is designed to assure that the slider operating arm 58 moves or slides in engagement with the transverse outer surface of transverse pivot rod 42 of operating lever 41 so that successive, transverse, narrow surface portions of the moving slider operating arm 58 underlie and form pivot surfaces for the transverse lever pivot rod 42 as it is pivotally retained within the pivot recess 45 of casing wall section 43' as slider arm 58 moves past it. A portion of slider operating arm 58 facing the transverse operating-lever arm-end 52 is provided with a bearing or pivot recess 59 for retaining in pivotal engagement a pivot pin 71 of charged toggle spring link 70.

The charged toggle spring link 70 has a helically coiled spring 76 of elastic spring material, such as spring metal, and its opposite spring ends are pivotally connected to pivot portion 59 of actuating slider 54 and transverse lever-arm end portion 52 of operating lever 41, which lever-arm end portion 52 serves as a pivot pin connection to the outer end of toggle spring link 70. In the exemplification shown, spring helix 76 is charged with elastically stored energy by holding it compressed between its two pivot connections 71 and 52 through which it is connected between the operating lever 41 and actuating slider 54. As is conventional in some compressed spring toggle links, the coil turns of the spring 76 are guided in their opposite contracting and expanding motion strokes by two relatively slidable, relatively rigid spring guide members 72, 74 having pivot heads 73, 75, respectively, through which the spring guide members 72, 74, and therethrough the coiled charge spring 76, are pivotally connected with the pivot portion 59 of actuating slider 54 and pivot end portion 52 of operating lever 41, respectively.

In the form shown, spring guide member 72 forms a cylindrical guide tube in the cylindrical interior of which is slidably guided the associated cylindrical spring guide member 74, the coiled spring 76 encircling the two cylindrical spring guide members 72, 74, shown in detail in FIGS. 7 and 8. The heads 73, 75 at the outer ends of the two spring guide members 72, 74 are sufficiently wide to retain with their inwardly facing surfaces the end coil turns of the compressed, helical charge spring 76 of spring toggle link 70. The head 73 of spring guide cylinder 72 has a slot for retaining therein the associated pivot pin with which it is pivotally connected and seated within the pivot recess 59 of the actuating slider portion 58 (FIGS. 1, 2, 3, 4, 6–8). The head 73 of spring guide cylinder 72 has a recess (not shown) which permits entry therein of pivot projection 59–1 of actuating slider portion 58 having pivot recess 59, for establishing and retaining pivotal engagement with pivot pin 71 held in the guide head 73 of spring toggle link 70. To reduce to a minimum, binding action that might obstruct movement of actuating slider 54 in its guide channel 56, the toggle pivot connection 71 with the actuating slider portion 58 are so designed and proportioned that in each of its opposite end positions, namely the full-line released position 41 of the operating lever and its dash-dot-line operative position 41–1, this operating lever has the same angular displacement from a symmetrical plane passing through the central axis of the center lever pivot 42 in a direction perpendicular to the central motion axis of the ejector structure 20 and its ejector guide rod 31.

To dispense a measured volume of instant coffee powder with the dispensing arrangement described thus far, while the jar and dispenser casing 10 are held in the inverted vertical position shown in FIG. 1, the upward end of actuating slider 54, as seen in FIG. 1, is actuated manually from its released position shown for sliding movement in a vertically downward direction. This causes the actuating slider portion 58 having pivot recess 59 to move downwardly, as seen in FIG. 1, thereby additionally charging in its downward motion, the compressed charging spring 76 with additional stored energy, without imparting any motion to the operating lever, and the ejector structure 20 remains in the full-line, closure position of FIGS. 1 and 2. As the pivot recess 59 of the pivot connection between actuating slider portion 58 and toggle spring link 70 passes a neutral position relatively to the opposite pivot connection 52 of toggle link 70 with lever arm 41, the charged energy of the spring 73 of toggle link 70 is suddenly released, thereby causing the released charge spring 76 to impart to the outer lever end 52 an abrupt motion which brings the operating lever 41 abruptly from the full-line position of FIG. 1, to the dash-dot-line position 41–1 as the charge spring link 70 is abruptly brought from the full-line position to the dash-dot-line position 70–1 indicating the axis of toggle spring link 70 in its operated ejector position.

With the operating lever 41 thus abruptly brought by the released toggle link spring 76 from the released, full-line closure position to the operated dash-dot-line ejector position 41–1, the ejector structure 20 is likewise brought abruptly from its full-line closure position to its dash-dot-line ejector position 20–1, thereby causing the ejector intercepter surfaces 26, 27 to eject through the discharge opening 71 of the dispensing casing 10, a measured volume of dispensed instant coffee powder into a cup in which coffee or the beverage is made. The interior casing space 15 of dispensing casing 10 and of the container 8 are thus open only during the short instant of the abrupt dispensing motion imparted to the ejector structure 20 upon sudden release of the stored energy of the charge spring toggle link 70 of the operating mechanism. In the dash-dot-line ejector position of the ejector structure 20, closure border edge portion 28 of ejector section 25 maintains closure or sealing engagement with the facing, inward surface portion of the downward funnel-shaped casing section of dispenser casing 10, thereby suppressing entry of moist air into the interior of dispenser casing 10 and container jar 8.

In an analogous manner, the ejector structure 20 is abruptly returned from the dash-dot-line ejector position 20–1 to its full-line closure position of FIG. 1, by imparting an oppositely-directed motion to actuating slider 54 as it is returned from the operated dash-dot-line ejector position 54–1 to the released or non-operative, full-line position 54 (FIGS. 1 and 2). Thus, with the dispensing arrangement shown, having the actuating slider 54 and the ejector structure 20 in their operative dash-dot-line positions 54–1 and 20–1, respectively, it may be operated to return these operating elements to their non-operative or closure positions, as follows:

With the jar 8 and dispenser casing 10 held either in the vertical, inverted position of FIG. 1, or in any other position, the initial return motion imparted to the actuating slider 54 held in its dash-dot-line ejector position 54–1, the initial return sliding motion imparted thereto will again charge the coiled spring 76 of toggle link 70 as its pivot connection 51 carried by actuating slider 54 moves therewith from the dash-dot-line position 54–1 towards a neutral position, in which maximum energy is stored in spring 76 of toggle link 70, while the operating lever 41 and ejector structure 20 remain in their dash-dot-line ejector positions 41–1, 20–1, respectively. A small amount of additional return movement imparted to actuating slider 54 past the neutral position of toggle link 76 towards the full-line closure position, releases the stored energy of toggle spring 76 and causes the spring to impart an analogous abrupt return movement to operating lever 41 and ejector structure 20, thereby returning them abruptly within a minutely short time, from the dash-dot-line ejector position 20–1 to the full-line closure position.

For a readily serviceable dispensing device, it is essential to minimize binding action to which the movement of the actuating slider 54 may be subjected as it is slidably actuated between the full-line closure position to the dash-dot-line ejector position 54–1. To this end, the slider section 58 of actuating slider 54, which is relatively remote or separated by a substantial distance from the slider length held within its guide channel 56, is subjected to tilting forces which cause the length of the actuating slider 54 passing through guide channel 56 to engage only the end edge portion 56–1 of its guide channel 56. The so-applied tilting forces assure that the substantial length of the actuating slider 54 held within the guide channel 56, maintains frictional engagement with only short end portions 56–1 thereof, thereby reducing friction-binding forces between the actuating slider and its guide channel 56 to a very low or negligible level. As a result, the dispenser device of the invention requires only small applied physical force for dispensing a measured amount of instant coffee powder or like substance.

The dispensing device of the invention may also be provided with automatic return means whereby its ejector structure 20 and associated operating elements are automatically returned with an abrupt motion, from their ejector-position (corresponding to the dash-dot-line ejector position 20–1 of ejector structure 20) to the full-line closure position of ejector structure 20. One form of such automatic return means is embodied in the dispensing device shown in the drawings. The operating end of actuating slider 54, which is remote from its toggle link section 58, has a lateral actuating arm 81, which in itself may be used as a manual grip for manually actuating the acuating slider 54 between its released, full-line, closure position shown, to the dash-dot-line operating ejector position 54–1. In accordance with the invention, such lateral actuating arm 81 of actuating slider 54 is combined with additional charged spring means arranged so as to require only relatively small or negligible additional actuating forces for imparting to the actuating slider 54 an operating stroke which brings it from the released full-line closure position past its neutral position, towards its operated, dash-dot-line ejector position 54–1, while assuring that the additional spring means automatically returns the released actuating slider 54 and therewith the other operating parts, from its dash-dot-line ejector position 54–1, past its neutral position, to the released, full-line closure position 54.

In the form of the invention shown, an actuating lever 82 is pivotally connected, as by pivot pin 83, with a pivot support formed on a wall of casing section 55 adjoining the guide channel 56–1 of dispensing casing 10. A link member 85 shown in detail in FIGS. 10 and 11, is pivotally connected as by two pivot pins 86, to a pivot end of lateral arm 81 of actuating slider 54 and a wall portion of actuating lever 82, which is relatively remote from its pivot connection 83. The two pivot connections 86 of actuating lever link 85 define the axis of this link, and this lever link 85 with its pivot connections 86 are so designed that when the actuating lever 82 is tilted on its pivot 83 from the full-line released, closure position shown, to the operated dash-dot-line ejector position 82–1 wherein it engages a facing, laterally-projecting grip portion 98 of casing section 55, the axis of lever link 85 will assume the dash-dot-line ejector position 85–1. In these two opposite end-positions of actuating lever link 85, its axis will be displaced by the same angle in opposite directions from a plane of symmetry passing through its pivot pin connection 86 with slider arm 81 and parallel to the direction of the slider motion of actuating slider 54. Such design of the pivot link 85 between actuating lever 82 and actuating slider 54, aids in reducing binding friction forces that might obstruct the sliding motion of actuating slider 54 in the guide channel 56 of the associated casing section 55.

The facing portions of the actuating lever 82 and casing grip 98 provide seats for retaining between them the opposite ends of an additional charge spring 91, which tends to return the actuating lever 82 to its released, full-line closure position shown, from its dash-dot-line ejector position 82–1, when tilting the actuating lever 82 on its pivot 83, from the released closure position of FIG. 1 to its operated, dash-dot-line ejector position 82–1. Its spring 91 has elastically stored therein sufficient additional charge energy so as to cause the release actuating lever 82 to be instantly returned from its operated dash-dot-line position 87–1 to the non-operating position 82, and thereby impart return motion to its actuating slider 87, whereby the ejector structure 20 is abruptly returned from its dash-dot-line ejector position 20–1 to its full-line closure position shown.

With such actuating mechanism, the dispensing device of FIG. 1 may be used to dispense a measured volume of powder particles from a large powder mass held stored in the jar while holding the jar and its dispensing casing in a generally vertical, inverted position, such as shown in FIG. 1, as follows: The thumb and index fingers of the user's hand, for example, apply an actuating motion to the front end of actuating lever 82 and the underlying casing grip 98 to bring the actuating lever 82 from its released full-line position to the operating dash-dot-line position 82–1. This actuation motion imparts an actuating sliding motion to actuating slider 54 for causing it to operate as described above, and bring the ejector structure 20 with an abrupt ejector motion to the dash-dot-line ejector position 20–1, in which it dispenses a measured volume of instant coffee powder. Momentary release of the operating lever 82 causes the compressed additional charged spring 91 to impart to actuating slider 54 an initial return motion, which brings it from its dash-dot-line operating position 54–1, past its neutral position, wherein the charged energy of toggle link spring 76 imparts an abrupt return motion to the ejector structure 20 as well as the actuating slider 54, thereby bringing them together with actuating lever 82 to the full-line released positions shown. Any desired measured quantities of the solid powder substance stored in the jar, may be dispensed by a series of similar short dispensing operations imparted to actuating lever 82, which is returned to its released position instantaneouly upon completing each abrupt dispensing stroke of the ejector structure 20.

As brought out above, instant coffee is highly hygroscopic. In accordance with the invention, to assure that moist air cannot enter into and that aroma, flavor and essences cannot escape from the interior of the dispensing casing 15 and the container jar within which the instant coffee powder is stored, the discharge opening 17 of dispensing casing 15 is closed not only by closure engagement of ejector closure section 23 with the closure edge 24 of the casing discharge opening 17, but also by an additional air or gas-tight closure applied to the discharge opening 17 of dispensing casing 10. In accordance with the invention, the discharge opening region of dispenser casing 10 is adjoined by a tubular, outwardly-projecting casing neck 18 surrounding a neck compartment 19 of somewhat greater cross-sectional area than the discharge opening and extending outwardly beyond the widest outermost border edge 23 of the ejector closure section. The outer open end of this casing neck compartment 19 is arranged to be hermetically sealed or closed by a detachable sealing cover of any known form, such as conventional bottle stoppers or closures, which assures that the neck compartment 19 is sealed against entrance of vapor-containing exterior air. The interior, tubular wall surface of the neck compartment 19 is given a shape which assures that the dispensed powder volume which is rapidly ejected therethrough does not spread laterally, but flows in a relatively narrow stream. To this end, the interior tubular wall surfaces are made to converge toward the outer end of the compartment. However, the desired narrow-stream ejection of the dispensed powder is also secured by giving the tubular wall surfaces of neck compartment 19 a cylindrical shape, or in general, having them extend parallel to a center axis of the neck compartment 19 defining the direction of the powder ejection path. One example of a hermetically-sealing cover for the casing neck compartment 19 is shown in FIG. 1.

The tubular casing neck compartment 19 of tubular casing neck 18 is shown hermetically sealed or closed by a detachable cover 90–1 of elastically stretchable material having a cover wall overlying the neck compartment 19 and the adjacent edge end face of tubular casing neck 18. The cover 90–1 has an elastically stretchable rim 90–2 held stretched through engagement of its inward end region 90–3 with the facing exterior wall portions of tubular casing neck 18, for holding stretched and under pressure the cover wall 90–1, in tight sealing engagement with the edge end faces of tubular casing neck 19. This stretched engagement of cover wall 90–1 with the underlying edge end surfaces of casing opening neck 18 assures that the end face of the opening of tubular casing neck 18 is held in tight sealing engagement with overlying wall portions of cover sealing wall 90–1 held elastically stretched thereover. The elastic closure cover 90–1 is similar to those used for sealing bottles or containers for charged mineral water and the like. The cover wall 90–1 may be provided with a lip (not shown) which simplifies its removal from its stretched sealing engagement with the tubular casing neck 18 or for returning it to the closed sealing position. The cover wall 90–1 may also be provided with a conventional tail strip (not shown) having a retainer collar fitted over the narrower end region of the funnel-shaped end region of the dispensing casing 10 for retaining the cover wall 90–1 on casing 10 while coffee is dispensed therewith.

As explained above, the closure section 21 of ejector structure 20 has an outward end edge boundary 23 somewhat larger than the casing opening 17 which is closed thereby, and the ejector section 25 has an interceptor surface 27 with a lateral boundary somewhat larger than the neck opening 17, for closing the casing in the outward ejecting position of ejector structure 20. The closure section 21 is indicated as being separable from the interceptor section 27 of the ejector structure, and they are assembled from the opposite open ends of casing 15 and thereafter joined into the integral ejector structure. Thus the closure section 21, the ejector section 25 and the ejector guide rod 31 may be formed of separate parts and they may be assembled together from opposite open sides of the casing 15 in the region of its opening 17, and then integrally joined to each other in assembled position by suitable conventional junction means, for instance by a coaxial screw, indicated by dash lines in FIG. 1, or by interfitting clamping and/or cement joints.

The casing wall section 43' and the associated rigid wall portion—which provides the guide channel 56 for the actuating slider 54 and the compartment for the toggle spring link 70 and associated operating lever arm 51—has a detachable side-wall extending, for instance, in a plane parallel to the plane of FIGS. 1 and 2, for exposing their interior, in which these elements may be inserted and assembled in their operative positions shown, such cover wall being thereafter attached to the adjacent wall portions, as by a screw or by conventional overlapping clamping and/or cement joints.

Without thereby limiting its scope, there are given below, further data about specific embodiments of dispensers of the invention. The actual dimensions of the dispensing casing are such that its casing junction portion 11 fits over and is attachable to the conventional neck of a conventional glass jar for sealing its interior in which instant coffee is stored. The coil springs 76 and 91 are made of conventional spring metal, such as beryllium copper, stainless steel or the like. All other parts of the dispenser may be made either of suitable metal having a non-corroding, smooth exterior, or coated with a non-corrosive smooth exterior, such as a tightly adhering chromium plating, or of a suitable synthetic resin material having the required physical characteristics with respect to strength and otherwise. As an example, the casing 15 with all its parts may be formed of polypropylene or polyacetal ("Delrin"), or other resin materials having similar characteristics. Good results are obtained with a casing of polypropylene. Such plastic casing structure may be formed, for instance, with a main casing section having the junction flange 11 and the neck 18, and a detachable complementary casing section forming the compartment within which the actuating slider 54, the toggle spring link 70 and the lever pivot 14, together with the sealing washer 48 and its associated clamping collar 49, are operatively mounted in the manner described above. The two casing sections may be provided with interfitting, overlapping junction wall portions through which they are joined into a unitary structure by interfitting junction engagement or overlapping casing junction parts, with or without application of cement to their junction surfaces.

The ejector structure 20 consisting of ejector elements 21, 25, 31, the operating lever 41, the guide collar 32 with its integral guide spokes, the toggle spring guide members 72, 74, the actuating slider 54 and its link 85, may all be made of polyacetal resin ("Delrin"), or a synthetic resin material having similar high tensile strength. All other parts of the dispensing device of the invention such as described above, may be made of polypropylene or other synthetic resin material having similar physical properties, except that the sealing washer 48 is made of a rubber-like material, as explained above. The ejector structure may be formed of a molded closure section 21 and a separately molded ejector section 25 having the guide rod 31 integrally molded therein. The closure section 21 and ejector section 25 are joined in assembled position by interfitting, overlapping junction elements, for instance by providing the inward, narrow end of closure section 21 with a coaxial, rod-like projection fitting into a coaxial, central complementary junction recess of the facing ejector section 25 to which it is affixed by interfitting clamping engagement and/or cement applied to their interfitting junction surfaces.

In order to suppress clinging of moisture-containing coffee powder particles to surface portions of the dispenser device 10-1 with which the powder comes in contact, all body parts of the dispenser device which may be contacted by such powder are given the property of repelling such powder particles. This may be done by forming dispenser parts such as dispenser casing 10, ejector structure 20, and operating lever 41, out of a synthetic resin body containing a small amount of a liquid perfluoro compound which contains perfluoro groups ($-CF_3$) or ($-CF_2$) or both, which perfluoro groups have the property of migrating from the interior of such synthetic resin body and form on its exterior a continuously renewable, continuous exposed monoatomic layer or stratum of such perfluoro groups. Such monoatomic stratum of perfluoro groups gives the exterior of such body a self-renewable, low-energy surface and causes it to repel powder particles or substances that would otherwise adhere thereto. Good results are obtained by embodying in the resin material of such body portions, .005% to 2% of such perfluoro compound. Fluorinated compounds suitable for this purpose include those described in U.S. Patents 2,567,011; 2,662,835; 2,693,458; 2,727,923; 2,759,019; 2,679,479; 2,765,851; 2,559,629, and in the co-pending application Serial No. 436,073, filed June 11, 1954, of Fred Schulman.

It will be apparent to those skilled in the art that the novel principles of the invention disclosed herein in connection with a specific exemplification thereof, will suggest various other modifications and applications of the same. It is accordingly desired that in construing the breadth of the appended claims, they shall not be limited to the specific exemplification of the invention described herein.

I claim:

1. In a dispensing device for dispensing a measured volume of flowable particle substance consisting of discrete solid particles flowing outwardly from a container having an outlet portion with a relatively large outlet opening; a dispenser casing structure having an inward casing section with a receiving opening at one casing end for establishing a detachable, sealed flow connection with the container outlet portion and its opening, and an adjoining outward casing section with a discharge neck surrounding a discharge opening at the opposite casing end, the interior discharge surface of the outward casing section adjoining said discharge opening having an outwardly narrower, funnel shape for discharging said particle substance, an ejector structure having a closure section and a more inward ejector section coaxially aligned with each other and held in said casing for reciprocal movement along an ejector path between an inward closure and outward ejector end position, said ejector structure having an interceptor surface extending transversely to said ejector path for intercepting substance particles filling the funnel-shaped casing section for ejecting said particles through said discharge opening upon abrupt movement of said ejector structure from its inward closure to its outward ejector position, ejecting means including chargeable spring means carried by said casing structure and connected to said ejector structure for actuating it between its closure and its ejector positions, said ejecting means including release means movable along an actuating path and operative after a predetermined initial movement from its closure position to release said spring means and cause said spring means to bring said ejector structure with abrupt motion from its closure to its ejector position, said closure section having an inwardly facing closure surface held in closure engagement with an outwardly facing closure surface of said discharge neck in said closure position.

2. In a dispensing device for dispensing a measured volume of flowable particle substance consisting of discrete solid particles flowing outwardly from a container having an outlet portion with a relatively large outlet opening; a dispenser casing structure having an inward casing section with a receiving opening at one casing end for establishing a detachable, sealed flow connection with the container outlet portion and its opening, and an adjoining outward casing section with a discharge neck surrounding a discharge opening at the opposite casing end, the interior discharge surface of the outward casing section adjoining said discharge opening having an outwardly narrower, funnel shape for discharging said particle substance, an ejector structure having a closure section and a more inward ejector section coaxially aligned with each other and held in said casing for reciprocal movement along an ejector path between an inward closure and outward ejector end position, said ejector structure having an interceptor surface extending transversely to said ejector path for intercepting substance particles filling the funnel-shaped casing section for ejecting said particles through said discharge opening upon abrupt movement of said ejector structure from its inward closure to its outward ejector position, ejecting means including chargeable spring means carried by said casing structure and connected to said ejector structure for actuating it between its closure and its ejector positions, and an actuating member movable along an actuating path from a released position to cause in the initial movement thereof to first charge said spring means and to release the charged spring means upon further movement of said actuating member to cause the released spring means to impart to said ejector structure an abrupt movement from its closure to its ejector position, said closure section having an inwardly facing closure surface held in closure engagement with an outwardly facing closure surface held in closure engagement with an outwardly facing closure surface of said discharge neck in said closure position.

3. In a dispensing device for dispensing a measured volume of flowable particle substance consisting of discrete solid particles flowing outwardly from a container having an outlet portion with a relatively large outlet opening; a dispenser casing structure having an inward casing section with a receiving opening at one casing end for establishing a detachable, sealed flow connection with the container outlet portion and its opening, and an adjoining outward casing section with a discharge neck surrounding a discharge opening at the opposite casing end, the interior discharge surface of the outward casing section adjoining said discharge opening having an outwardly narrower, funnel shape for discharging said particle substance, an ejector structure having a closure section and a more inward ejector section coaxially aligned with each other and held in said casing for reciprocal movement along an ejector path between an inward closure and outward ejector end position, said ejector structure having an interceptor surface extending transversely to said ejector path for intercepting substance particles filling the funnel-shaped casing section for ejecting said particles through said discharge opening upon abrupt movement of said ejector structure from its inward closure to its outward ejector position, ejecting means including chargeable spring means carried by said casing structure and connected to said ejector structure for actuating it between its closure and its ejector positions, said ejecting means including release means movable along an actuating path and operative after a predetermined initial movement from its closure position to release said spring means and cause said spring means to bring said ejector structure with abrupt motion from its closure to its ejector posiiton, an elongated actuating slider slidably mounted on said casing for reciprocal sliding actuating motion along an actuating path between a released and operated position, an elongated operating lever having one lever end pivotally connected to said ejector structure and a lever pivot at an intermediate portion of said lever pivotally carried by said casing structure, whereby actuating motion imparted to the other lever end causes said lever to move said ejector structure between its two end positions, and compressed spring means having its opposite ends pivotally connected between the region of said other lever end and a slider pivot portion of said actuating slider, whereby sliding motion imparted to said actuating slider from its released position first charges said spring means and further motion of said slider releases spring energy from said spring means to move said lever together with said ejector structure abruptly from the closure to the ejector position.

4. In a dispensing device for dispensing a measured volume of flowable particle substance consisting of discrete solid particles flowing outwardly from a container having an outlet portion with a relatively large outlet opening; a dispenser casing structure having an inward casing section with a receiving opening at one casing end for establishing a detachable, sealed flow connection with the container outlet portion and its opening, and an adjoining outward casing section with a discharge neck surrounding a discharge opening at the opposite casing end, the interior discharge surface of the outward casing section adjoining said discharge opening having an outwardly narrower, funnel shape for discharging said particle substance, an ejector structure having a closure section and a more inward ejector section coaxially aligned with each other and held in said casing for reciprocal movement along an ejector path between an inward closure and outward ejector end position, said closure section having an inwardly facing closure surface held in closure engagement with an outwardly facing closure surface of said discharge neck in said closure position, said ejector structure having an interceptor surface extending transversely to said ejector path for intercepting substance particles filling the funnel-shaped casing section for ejecting said particles through said discharge opening upon abrupt movement of said ejector structure from its inward closure to its outward ejector position, ejecting means including chargeable spring means carried by said casing structure and connected to said ejector structure for actuating it between its closure and its ejector positions, said ejecting means including release means movable along an actuating path and operative after a predetermined initial movement from its closure position to release said spring means and cause said spring means to bring said ejector structure with abrupt motion from its closure to its ejector position, an elongated actuating slider slidably mounted on said casing for reciprocal sliding actuating motion along an actuating path between a released and operated position, an elongated operating lever having one lever end pivotally connected to said ejector structure and a lever pivot at an intermediate portion of said lever pivotally carried by said casing structure, whereby actuating motion imparted to the other lever end causes said lever to move said ejector structure between its two end positions, and compressed spring means having its opposite ends pivotally connected between the region of said other lever end and a slider pivot portion of said actuating slider, whereby sliding motion imparted to said actuating slider from its released position first charges said spring means and further motion of said slider releases spring energy from said spring means to move said lever together with said ejector structure abruptly from the closure to the ejector position.

5. In a dispensing device as claimed in claim 2, the laterally outer edge-region of said ejector section forming a closure edge establishing closure engagement with said funnel-shaped discharge surface and closing the interior of said container in the ejection position of said ejector structure.

6. In a dispensing device as claimed in claim 3, the laterally outer edge-region of said ejector section forming a closure edge establishing closure engagement with said funnel-shaped discharge surface and closing the interior of said container in the ejection position of said ejector structure.

7. In a dispensing device as claimed in claim 4, the laterally outer edge-region of said ejector section forming a closure edge establishing closure engagement with said funnel-shaped discharge surface and closing the interior of said container in the ejection position of said ejector structure.

8. In a dispensing device as claimed in claim 3, said chargeable spring means including two elongated guide members having mutually engaging longitudinal sliding surfaces along which they are relatively slidable in the direction of their length, and coiled spring elements held compressed between retainer portions of said two slider members for increasing their over-all length by motion along their sliding surfaces.

9. In a dispensing device as claimed in claim 4, said chargeable spring means including two elongated guide members having mutually engaging longitudinal sliding surfaces along which they are relatively slidable in the direction of their length, and coiled spring elements held compressed between retainer portions of said two slider members for increasing their over-all length by motion along their sliding surfaces.

10. In a dispensing device as claimed in claim 2, said casing structure having two opposite longitudinal guide surfaces facing and guiding opposite exposed surfaces of a slider section of said actuating slider in its said motion, said spring means subjecting said actuating slider to tilting forces for tilting said slider section transversely to its length and reducing its sliding friction with said guide surfaces.

11. In a dispensing device as claimed in claim 3, said casing structure having two opposite longitudinal guide surfaces facing and guiding opposite exposed surfaces of a slider section of said actuating slider in its said motion, said spring means subjecting said actuating slider to tiltng forces for tilting said slider section transversely to its length and reducing its sliding friction with said guide surfaces.

12. In a dispensing device as claimed in claim 4, said casing structure having two opposite longitudinal guide surfaces facing and guiding opposite exposed surfaces of a slider section of said actuating slider in its said motion, said spring means subjecting said actuating slider to tilting forces for tilting said slider section transversely to its length and reducing its sliding friction with said guide surfaces.

13. In a dspensing device as claimed in claim 2, said casing structure having two opposite longitudinal guide surfaces facing and guiding opposite exposed surfaces of a slider section of said actuating slider in its said motion, said spring means subjecting said actuating slider to tilting forces for tilting said slider section transversely to its length and reducing its sliding friction with said guide surfaces, an actuating lever pivotally connected to a portion of said actuating slider remote from said slider pivot portion of rimparting said slider motion to said actuating slider, a pivotal connection between said actuating lever and said actuating slider for subjecting said actuating lever to additional tilting forces augmenting said first-mentioned tilting forces in reducing sliding friction between said actuating slider and its guide surfaces in response to actuation of said actuating lever to move said actuating slider from its closure to its ejector position, and bias spring means interposed between a portion of said actuating lever and a facing portion of said casing structure for biasing said actuating lever and said actuating slider to return to closure position when said actuating lever is released from externally-applied forces.

14. In a dispensing device as claimed in claim 3, said casing structure having two opposite longitudinal guide surfaces facing and guiding opposite exposed surfaces of a slider section of said actuating slider in its said motion, said spring means subjecting said actuating slider to tilting forces for tilting said slider section transversely to its length and reducing its sliding friction with said guide surfaces, an actuatng lever pivotally connected to a portion of said actuating slider remote from said slider pivot portion for imparting said slider motion to said actuating slider, a pivotal connection between said actuating lever and said actuating slider for subjecting said actuating lever to additional tilting forces augmenting said first-mentioned tilting forces in reducing sliding friction between said actuating slider and its guide surfaces in response to actuation of said actuating lever to move said actuating slider from its closure to its ejector position, and bias spring means interposed between a portion of said actuating lever and a facing portion of said casing structure for biasing said actuating lever and said actuating slider to return to closure position when said actuating lever is released from externally-applied forces.

15. In a dispensing device as claimed in claim 4, said casing structure having two opposite longitudinal guide surfaces facing and guiding opposite exposed surfaces of a slider section of said actuating slider in its said motion, said spring means subjecting said actuating slider to tilting forces for tilting said slider section transversely to its length and reducing its sliding friction with said guide surfaces, an actuating lever pivotally connected to a portion of said actuating slider remote from said slider pivot portion for imparting said slider motion to said actuating slider, a pivotal connection between said actuating lever and said actuating slider for subjecting said actuating lever to additional tilting forces augmenting said first-mentioned tilting forces in reducing sliding friction between said actuating slider and its guide surfaces in response to actuation of said actuating lever to move said actuating slider from its closure to its ejector position, and bias spring means interposed between a portion of said actuating lever and a facing portion of said casing structure for biasing said actuating lever and said actuating slider to return to closure position when said actuating lever is released from externally-applied forces.

16. In a dispensing device as claimed in claim 1, said outward casing section having a tubular neck portion extending beyond the region of its discharge opening and surrounding a neck opening space of a cross-sectional area greater than the cross-sectional area of said discharge opening, the outward end of said ejector closure section projecting beyond said discharge opening being confined within said neck opening space, and a detachable cover of elastically yieldable material having a cover wall with a rim depending therefrom, said cover wall being held in gas-tight sealing engagement with the end surfaces of said tubular neck by elastically stretched portions of said rim engaging exterior wall surface portions of said neck.

17. In a dispensing device as claimed in claim 3, said outward casing section having a tubular neck portion extending beyond the region of its discharge opening and surrounding a neck opening space of a cross-sectional area greater than the cross-sectional area of said discharge opening, the outward end of said ejector closure section projecting beyond said discharge opening being confined within said neck opening space, and a detachable cover of elastically yieldable material having a cover wall with a rim depending therefrom, said cover wall being held in gas-tight sealing engagement with the end surfaces of said tubular neck by elastically stretched portions of said rim engaging exterior wall surface portions of said neck.

No references cited